US008733815B2

(12) United States Patent
Kwon

(10) Patent No.: US 8,733,815 B2
(45) Date of Patent: May 27, 2014

(54) TAILGATE OUTSIDE HANDLE ASSEMBLY

(75) Inventor: Young Jin Kwon, Seoul (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 93 days.

(21) Appl. No.: 13/157,883

(22) Filed: Jun. 10, 2011

(65) Prior Publication Data

US 2012/0128344 A1 May 24, 2012

(30) Foreign Application Priority Data

Nov. 18, 2010 (KR) ........................ 10-2010-0115279

(51) Int. Cl.
*B60J 1/18* (2006.01)
*E05B 1/00* (2006.01)
*G03B 29/00* (2006.01)

(52) U.S. Cl.
USPC ........... 296/50; 292/336.3; 292/347; 396/429

(58) Field of Classification Search
USPC ..................... 296/50, 56, 106; 292/336.3, 44; 396/429
See application file for complete search history.

(56) References Cited

U.S. PATENT DOCUMENTS 4,722,206 A * 2/1988 Nakamura et al. .............. 70/240
5,040,390 A * 8/1991 Mistry et al. .................... 70/241
7,273,991 B2 * 9/2007 Korultay et al. ........... 200/61.62
7,375,299 B1 5/2008 Pudney
7,504,601 B2 * 3/2009 Belmond et al. ........... 200/61.62
7,537,256 B2 * 5/2009 Gates et al. .................. 296/1.07
7,661,743 B2 * 2/2010 Williamson et al. ............ 296/50

FOREIGN PATENT DOCUMENTS

| | | | |
|---|---|---|---|
| JP | 1-223285 | A | 9/1989 |
| JP | 2007-196957 | A | 8/2007 |
| KR | 10-2006-0038213 | A | 5/2006 |
| KR | 10-0757150 | B1 | 9/2007 |
| KR | 10-0783533 | B1 | 12/2007 |
| KR | 10-2008-0023526 | A | 3/2008 |
| WO | WO 2008/074266 | A1 | 6/2008 |

* cited by examiner

*Primary Examiner* — Glenn Dayoan
*Assistant Examiner* — Sunsurraye Westbrook
(74) *Attorney, Agent, or Firm* — Morgan, Lewis & Bockius LLP

(57) ABSTRACT

A tailgate outside handle assembly may include a housing installed in an outer panel of a tailgate, an actuator unit, a manipulating handle installed in the housing and having a manipulation portion in a front surface thereof, and a hinge shaft that may be coupled to a top end portion of a rear surface of the manipulation portion, wherein a bottom end portion of the manipulation portion may be engaged with the actuator unit and selectively rotated about the hinge shaft such that after the manipulation portion may be withdrawn to the outside of the housing by a driving force of the actuator unit when the tailgate may be to be opened, the manipulating handle works as a handle.

9 Claims, 15 Drawing Sheets

TAILGATE OUTSIDE HANDLE ASSEMBLY

CROSS-REFERENCE TO RELATED APPLICATION

The present application claims priority to Korean Patent Application No. 10-2010-0115279 filed Nov. 18, 2010, the entire contents of which is incorporated herein for all purposes by this reference.

BACKGROUND OF THE INVENTION

1. Field of the Invention

The present disclosure relates to a tailgate outside handle assembly. More particularly, it relates to a tailgate outside handle assembly that exposes a handle grip to the outside by automatically withdrawing and rotating a manipulating handle.

2. Description of Related Art

In a recent vehicle demand trend, multi-purpose vehicles including recreational vehicles with economic feasibility and activity have been being widely sold out and consumers tend to have interest in practical and convenient multi-purpose vehicles.

A tailgate is generally provided at a rear side of a multi-purpose vehicle and includes an outside handle and an inside handle to be opened and closed.

FIG. 1 is a view illustrating an outside handle of a conventional tailgate.

As illustrated in FIG. 1, the outside handle of a conventional tailgate includes a switch handle (not shown) provided within a housing 2 mounted to a tail gate panel 1 and a logo portion 4 configured to expose a logo of a manufacturer integrally formed with a front surface of the housing 2.

The outside handle of a conventional tailgate allows a tailgate to be opened by pulling the switch handle through a hand insert space 3 of the housing 2 to manipulate a latch unit (not shown).

However, the outside handle of a conventional tailgate of FIG. 1 hampers the appearance of the tailgate as the hand insertion space of the housing is exposed to the outside of the tailgate.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY

Various aspects of the present invention are directed to providing a tailgate outside handle assembly that secures a handle function of a manipulating handle and improves an appearance of a logo integrated outside handle by forming a hand insert space, i.e., a handle grip inside the manipulating handle and rotating a bottom end portion of the manipulating handle to expose the handle grip to the outside while the manipulating handle is being withdrawn if the manipulating handle is pushed during an opening operation of the tailgate with the hand insert space being normally hidden.

It is another aspect of the present invention to provide a tailgate outside handle assembly that increases utility by applying a rear camera and an illumination unit to the handle grip and realizing a hidden rear camera for securing a rear visual field using a hidden handle grip exposed to the outside as the manipulation handle is withdrawn and rotated.

In further another aspect of the present invention, the tailgate outside handle assembly may include a housing installed in an outer panel of a tailgate, an actuator unit, a manipulating handle installed in the housing and having a manipulation portion in a front surface thereof, and a hinge shaft that may be coupled to a top end portion of a rear surface of the manipulation portion, wherein a bottom end portion of the manipulation portion may be engaged with the actuator unit and selectively rotated about the hinge shaft such that after the manipulation portion may be withdrawn to the outside of the housing by a driving force of the actuator unit when the tailgate may be to be opened the manipulating handle works as a handle.

The manipulating handle may be selectively engaged with a switch such that power may be applied to the actuator unit when the manipulating handle may be pushed to the switch.

The manipulating handle may have a handle housing formed at the rear surface of the manipulating portion and slidably mounted to the interior of the housing and a handle grip may be formed at a lower portion of the handle housing.

The manipulating handle may further include a movable housing pivotally coupled to the manipulation portion by the hinge shaft and being slidably mounted to the interior of the housing to slide therein, wherein a rotation guide hole may be formed on a lateral surface of the movable housing, and wherein an end of a rotary lever may be engaged with the actuator unit and the other end thereof may be slidably engaged with the rotation guide hole of the movable housing and a rear end portion of the handle housing through a rotary shaft, such that the actuator unit rotates the bottom end portion of the manipulation portion while the rotary lever pushes the movable housing and the handle housing outwards the housing with a rotational force of the actuator unit.

A latchet having a locking recess therein may be mounted to an upper surface of the movable housing and a locking pin integrally protrudes from an upper inner end of the housing such that the locking pin may be mounted into the locking recess to adjust a pushing amount of the manipulating handle.

A rotation guide boss may be formed at the rear surface of the manipulation portion, and the rotation guide boss of the manipulation portion and the movable housing may be pivotally coupled by the hinge shaft, such that the handle grip may be exposed to the outside of the housing by the actuator unit when the manipulating handle may be pushed.

A rear camera may be mounted to the handle grip.

The handle grip may include an illumination unit.

An elastic member may be installed to the hinge shaft, wherein an end of the elastic member may be coupled to the movable housing and the other end thereof may be coupled to the manipulation portion to bias the bottom end portion of the manipulation portion toward the interior of the housing.

The switch may be placed at a rear side of the movable housing in the housing such that when the manipulating handle may be pressed toward the interior of the housing, the movable housing may be pushed toward the interior of the housing to turn on the switch and apply power to the actuator unit.

The actuator unit may be a motor, and a gear train having a worm formed in an output shaft of the motor and a worm gear enmeshed with the worm.

The methods and apparatuses of the present invention have other features and advantages which will be apparent from or are set forth in more detail in the accompanying drawings, which are incorporated herein, and the following Detailed Description, which together serve to explain certain principles of the present invention.

Figure 1:
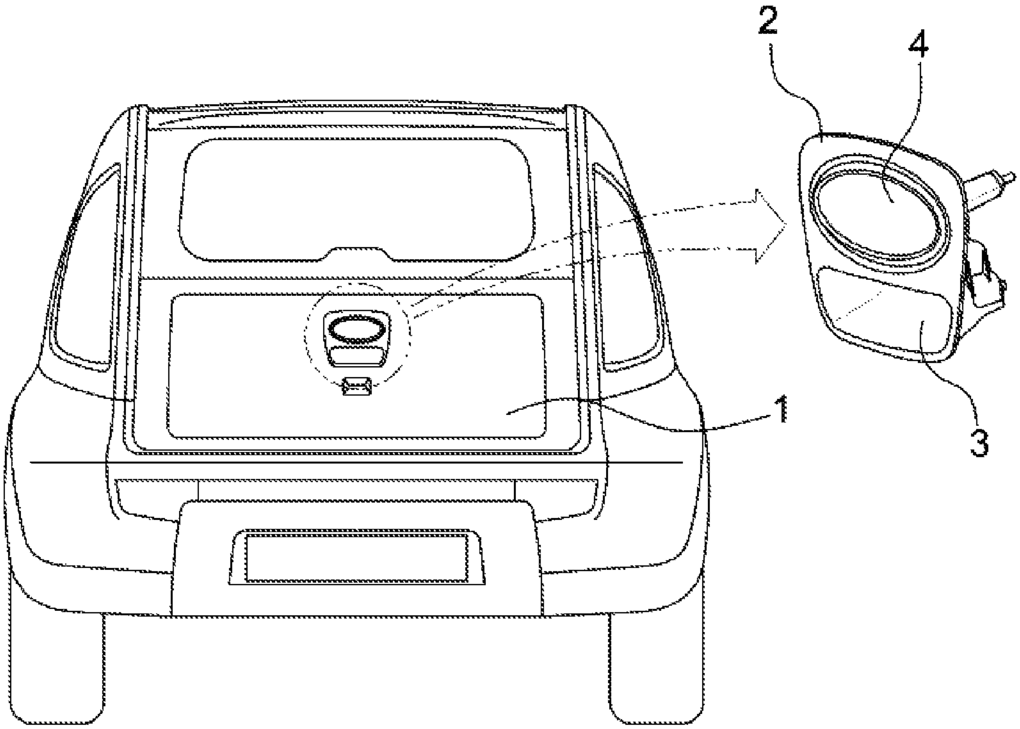
FIG.1 (Related Art)
FIG. 1 is a perspective view illustrating a conventional logo integrated tailgate outside handle.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Figure 2:
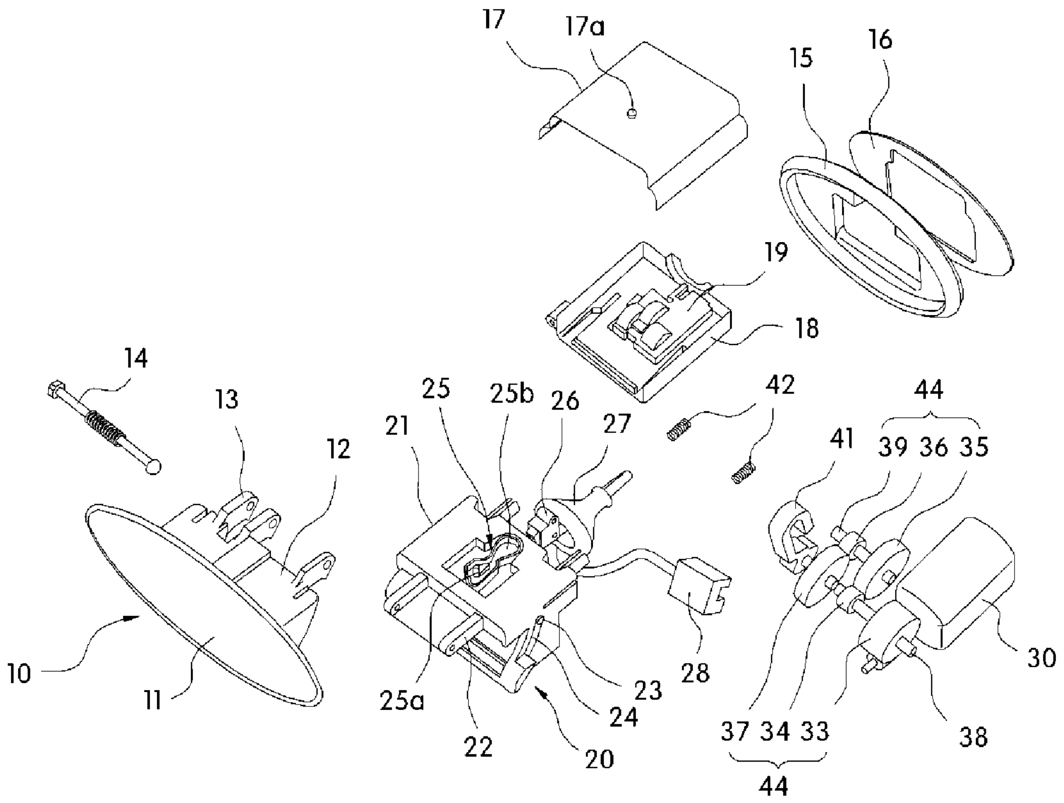
FIG. 2 is an exploded perspective view illustrating a tailgate outside handle according to an exemplary embodiment of the present invention.
Figure 3:
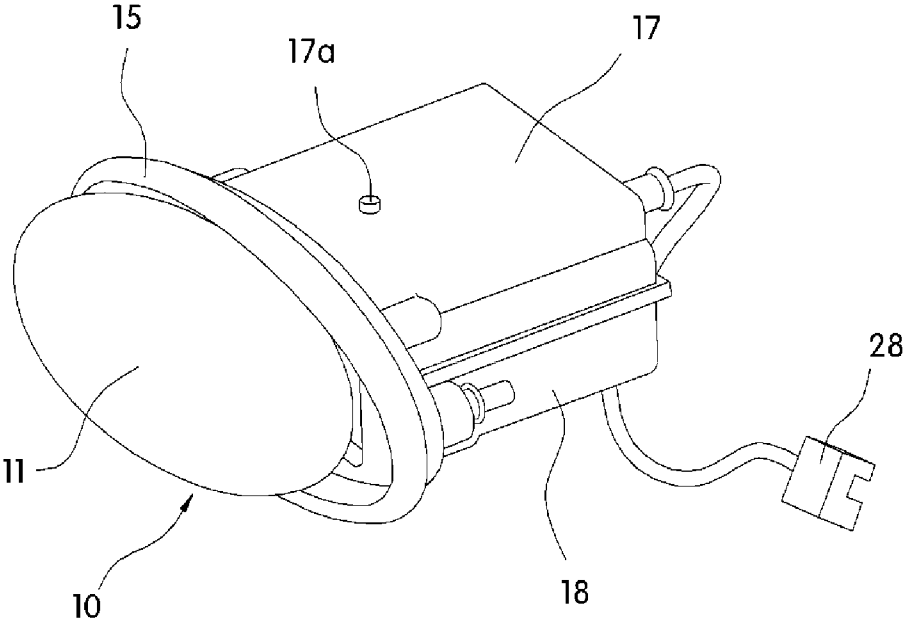
FIG. 3 is an assembly view of FIG. 2.
Figure 4:
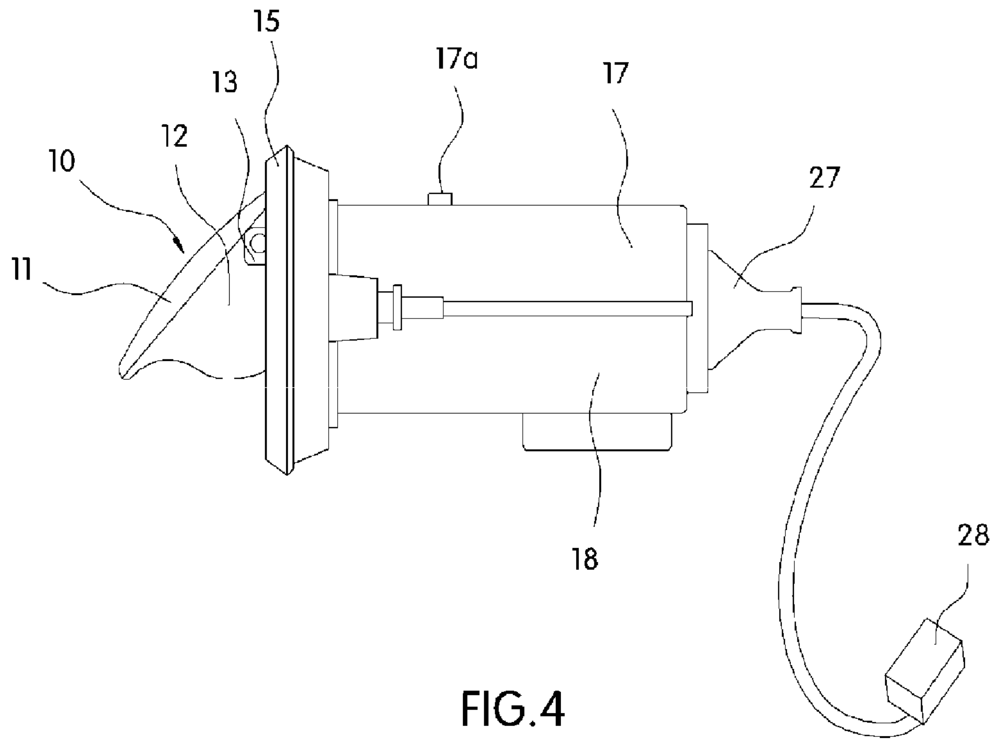
FIG. 4 is a side view of FIG. 3.
Figure 5:
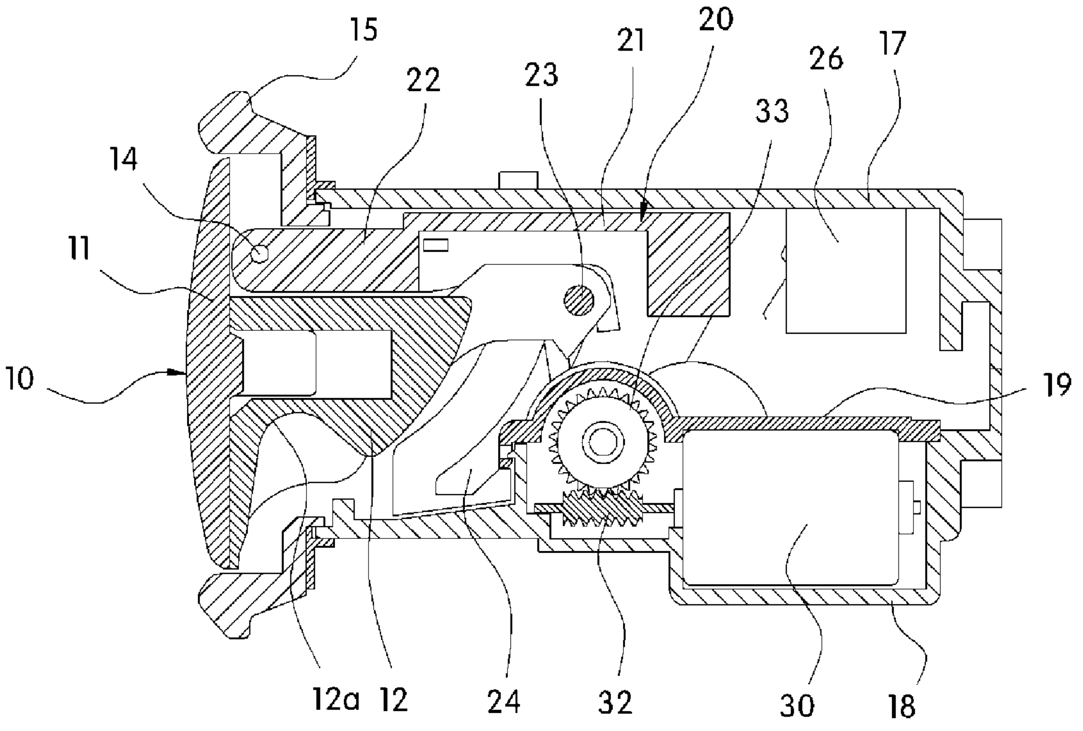
FIG. 5 is a sectional view of FIG. 4.
Figure 6:
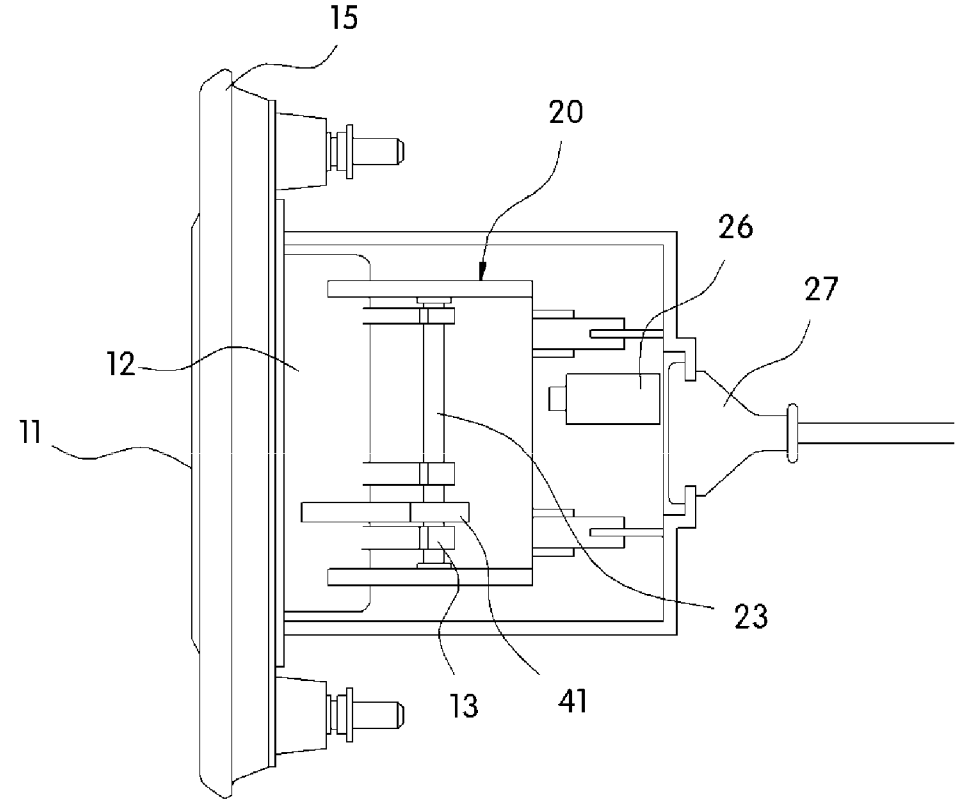
FIG. 6 is a bottom view of FIG. 5.
Figure 7:
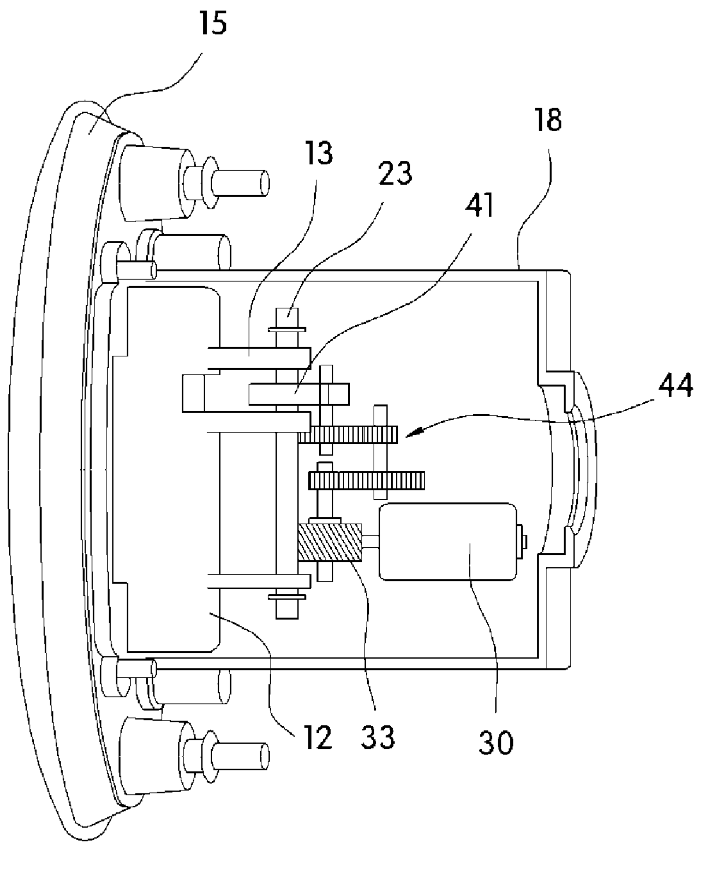
FIG. 7 is a top view illustrating an assembly structure of a movable housing, a rotary shaft, and a gear train of FIG. 2.

FIG. 2 is an exploded perspective view illustrating a tailgate outside handle according to an exemplary embodiment of the present invention. FIG. 3 is an assembly view of FIG. 2. FIG. 4 is a side view of FIG. 3. FIG. 5 is a sectional view of FIG. 4. FIG. 6 is a bottom view of FIG. 5. FIG. 7 is a top view illustrating an assembly structure of a movable housing 20, a rotary shaft 23, and a gear train 44 of FIG. 2.

The present invention relates to a tailgate outside handle assembly that improves an appearance of a manipulating handle 10 by exposing a hand insert space hidden inside the manipulating handle 10 as the manipulating handle 10 automatically projects and rotates if it is pushed to open a tailgate.

The tailgate outside handle assembly includes a manipulating handle 10 gripped and lifted by a hand of a user to open and close a tailgate, a rotary shaft 23 and an operation lever for withdrawing and rotating the manipulating handle 10, a movable housing configured to guide movement of the rotary shaft 23 while withdrawing the manipulating handle 10, and a drive unit configured to rotate the operation lever.

The manipulating handle 10 may be a logo integrated outside handle, and includes a manipulation portion 11 provided at a certain position of the tail gate.

That is, the manipulating handle 10 includes a logo portion 11 which serves as the manipulation portion of the tail gate and by which a name of a manufacturer or a logo made by the manufacturer itself is realized, and a handle housing 12 integrally formed with a rear surface of the logo portion 11 and having a handle grip at a front lower portion thereof.

The manipulating handle 10 is installed in an outer panel of the tailgate to be withdrawn and rotated, and the logo portion 11 is disposed on a front surface of the manipulating handle 10 to be exposed to the outside of the chassis to symbolically display the manufacturer.

The logo portion 11 may be a circular shape according to the shape of a used logo, but the logo portion 11 according to an exemplary embodiment of the present invention has an elliptical shape whose main axis is along the widthwise direction of the vehicle.

The handle housing 12 is disposed on a rear surface of the manipulating handle 10 and is hidden by the logo portion 11 when the manipulating handle 10 is closed.

The handle grip is a portion of the handle housing 12 by which a user grips and lifts the handle housing 12 to open the tailgate. A user can grips the hand grip with a hand using a recess upwardly formed at a lower portion of the handle housing 12.

When the manipulating handle 10 is normally closed, the hand grip is hidden by the logo portion 11, but if the logo portion 11 of the manipulating handle 10 is pushed to open the tailgate, the manipulating handle 10 is withdrawn and rotated. Then, as the handle housing 12 located on the rear surface of the manipulating handle 10 is withdrawn to the outside of a rear portion of the chassis to be exposed to the outside, such that a user can grip and lift the handle grip with a hand to open the tailgate.

Hinge portion project from a top end of the rear surface of the logo portion 11 and a hinge shaft 14 passes through the hinge portions. The hinge portions of the logo portion 11 are hingedly coupled to a push boss of the movable housing 20 through the hinge shaft 14 such that a bottom end portion of the manipulating handle 10 is rotated upward and downward about the hinge shaft 14 to be opened and closed.

Three rotation guide bosses 13 protrude to the inside of the chassis at a top end portion of the handle housing 12 and an insert hole is formed at an end portion of each rotation guide boss 13. As one end of the rotation guide boss 13 is rotated by a rotary shaft 23 passing through the insert holes and a guide hole of the movable housing 20 such that a bottom end portion of the manipulating handle 10 is rotated upward and downward.

A logo base 15 is installed in a tailgate outside panel in which the manipulating handle 10 is installed and a peripheral portion of the logo base 15 surrounds a peripheral portion of the logo portion 11 in an elliptical shape. Then, the logo base 15 has an insert recess toward the inside of the chassis such that the logo portion 11 is inserted into the insert hole toward the inside of the chassis to a degree if a user pushes the logo portion 11.

An opening is formed at a middle portion of the logo base 15 such that the movable housing 20 can be withdrawn toward the front and rear sides of the chassis through the opening of the logo base 15.

A base pad 16 is installed between a rear surface of the logo base and the tailgate outside panel to seal a space between the logo base portion 15 and the tail gate outer panel.

A top housing 17 and a bottom housing 18 are assembled on the rear side of the base cover, and the movable housing 20, the rotary lever 41, a motor 30 which serves as the drive actuator (hereinafter, referred to as a drive motor), and the gear train 44 are mounted between the top housing 17 and the bottom housing 18.

The movable housing 20 is an operational mechanism adapted to withdraw and rotate the manipulating handle 10 to the outside of the chassis, and includes a body 21, push bosses 22 projecting on opposite sides of the top end of the body 21 toward the outside of the chassis, and rotation guide holes 24 formed on opposite side surfaces of the body 21.

The movable housing 20 is installed between the top housing 17 and the bottom housing 18 such that it can be withdrawn or inserted toward the front or rear side of the chassis.

A horizontal member is integrally formed with the bottom surface of the push bosses 22 to reinforce the strength of the push bosses 22. A through-hole is formed at an end of each push boss 22 and the hinge shaft 14 passes through the through-holes of the push bosses 22 and the hinge portion formed at the top end of the rear surface of the logo portion 11, such that a bottom end portion of the manipulating handle 10 can be rotated about the hinge shaft 14.

The rotation guide holes 24 are formed on opposite surfaces of the body in a circular shape and the rotary shaft 23 passes through the rotation guide bosses 13 formed at the rear end of the handle housing 12 of the manipulating handle 10 such that the rotation guide bosses 13 are coupled to the rotary shaft 23. Then, opposite ends of the rotary shaft 23 is rotatably coupled along the rotation guide holes 24 such that the rotation guide bosses 13 can be rotated by the rotary shaft 23 along the rotation guide holes 24.

The drive motor 30, the gear train 44, and the rotary lever 41 are provided as the means for driving and rotating the rotary shaft 23.

The motor cover 19 is disposed at an upper portion of the drive motor 30 to cover upper portions of the drive motor 30 and the gear train 44, and a rear end portion of the motor cover 19 is fixed to the inside of the bottom housing 18.

The gear train 44 includes a plurality of gears for reducing an RPM of the motor, and includes a worm 32 formed at an end of the output shaft of the motor, a worm gear 33 enmeshed with the worm 32, a driving gear 34 connected to the worm gear 33 through the drive shaft 38, a first driven gear 35 enmeshed with the driving gear 34, a second driven gear 36 connected to the first driven gear 35 through a driven shaft 39, and a third driven gear 37 enmeshed with the second driven gear 36.

Then, the worm 32 and the worm gear 33, the driving gear 34 and the first driven gear 35, and the second driven gear 36 and the third driven gear 37 are engaged with each other at different gear ratios, reducing an RPM of the drive motor 30.

A bottom end portion of the rotary lever 41 is connected to the third driven gear 37 through a central shaft of the third driven gear 37 and a top end portion of the rotary lever 41 is rotated integrally about the central shaft of the third driven gear 37. Then, the rotary lever 41 has the same RPM and rotational angle as those of the third driven gear 37.

Accordingly, if the drive motor 30 is operated, the worm gear 33 enmeshed with the worm 32 is rotated while they worm 32 connected to an output shaft of the motor and the drive shaft 38 integrally coupled to the center of the worm gear 33 is rotated at the same RPM.

Then, the driving gear 34 connected to the drive shaft 38 is rotated while the drive shaft 38 is rotating, and the second driven gear 36 connected to the first driven gear 35 enmeshed with the driving gear 34 through the driven shaft 39 is rotated while the first driven gear 35 is rotating.

At the same time, the rotary lever 41 connected to the third driven gear 37 through the central shaft is rotated in the counterclockwise direction while the third driven gear 37 enmeshed with the second driven gear 36 is rotating.

A top end portion of the rotary lever 41 has a hook shape to be caught by one side of the rotary shaft 23 and thus is rotated by a rotational force transferred through the central shaft. In this case, the movable housing 20 is withdrawn by a certain distance (for example, approximately 10 mm) when the rotary shaft 23 is pushed toward the outside of the chassis, and then if rotary lever 41 is further rotated downward, it pushes the rotary shaft 23 downward, rotating the rotary shaft 23 along the rotation guide holes 24.

Here, a first micro-switch 26 is installed at an inner rear end of the top housing 17 to switch on the power of the drive motor 30.

The micro-switch 26 includes a switch body, a contact terminal formed at an end of the switch body, and a contact pin formed at a top end portion of the switch body to contact with the contact terminal, such that if the movable housing 20 moves toward the interior of the chassis so that a rear end portion of the movable housing 20 pushes the contact pin, the first micro-switch 26 is switched on and power is supplied to the drive motor 30 electrically connected to the first micro-switch 26 by an ON signal of the first micro-switch 26 to operate the drive motor 30.

The first micro-switch 26 is assembled in and fixed to the top housing 17 and the bottom housing 18 by means of the switch housing 27.

A fixing recess is recessed at an upper portion of the movable housing 20 such that a ratchet 25 is fixed to the fixing recess, and the ratchet 25 has a front portion and a rear portion each having a locking recess **25*b* and a ratchet boss 25*a* is formed on the bottom surface of the interior of the front portion of the ratchet 25**.

Locking pins protrude upward and downward at a middle portion of the top housing 17 such that a lower portion of the locking pin **17*a* protruding to the inside of the top housing 17 is inserted into the locking recess 25*b* of the ratchet 25, and the movable housing 20 controls a pushing amount of the manipulating handle 10 by means of the interference between the latchet 25 and the locking pin 17*a*** while it is moving forward and rearward.

For example, the top housing 17 is fixed to a rear surface of the base pad 16, and the locking recess **25*b* of the rear portion of the latchet 25 is caught by the locking pin 17*a* when the movable housing 20 is moved to the outside of the chassis with the locking pin 17*a* integrally formed with the upper portion of the top housing 17 being inserted into the locking recess 25*b* of the latchet, in which case the movable housing 20 is prevented from being moved to the outside of the chassis to regulate a withdrawing amount of the manipulating handle 10**.

Meanwhile, when the movable housing 20 is moved to the inside of the chassis, the locking recess **25*b* of the front portion of the latchet is caught by the locking pin, in which case the movable housing 20 is prevented from being moved to the inside of the chassis to regulate the withdrawing amount of the manipulating handle 10**.

A spring is inserted into a middle portion of the hinge shaft 14 such that one end thereof is fixed to a horizontal member of the movable housing 20 and an opposite end thereof is fixed to a rear surface of the logo portion 11, resiliently supporting the manipulating handle 10 rotated about the hinge shaft 14 clockwise.

For example, a repulsive force of the spring is generated in a reverse direction of the rotational direction of the manipulating handle 10 when a bottom end portion of the manipulating handle 10 is opened by a driving force of the drive motor 30 and a resilient restoring force of the spring is generated in a forward direction of the rotational direction of the manipulating handle 10, allowing the manipulating handle 10 to be rotated smoothly and without being shaken by the spring.

The means for detecting the position of the manipulating handle may include a second micro-switch.

The second micro-switch contacts with the movable housing 20 moved to the inside of the chassis when the manipulating handle 10 is opened and then return to the original position to detect that the manipulating handle 10 is returned and output a detection signal to a body control module (BCM).

A method for manipulating the tailgate outside handle according to an exemplary embodiment of the present invention will be described with reference to FIG. 8.

Figure 8:
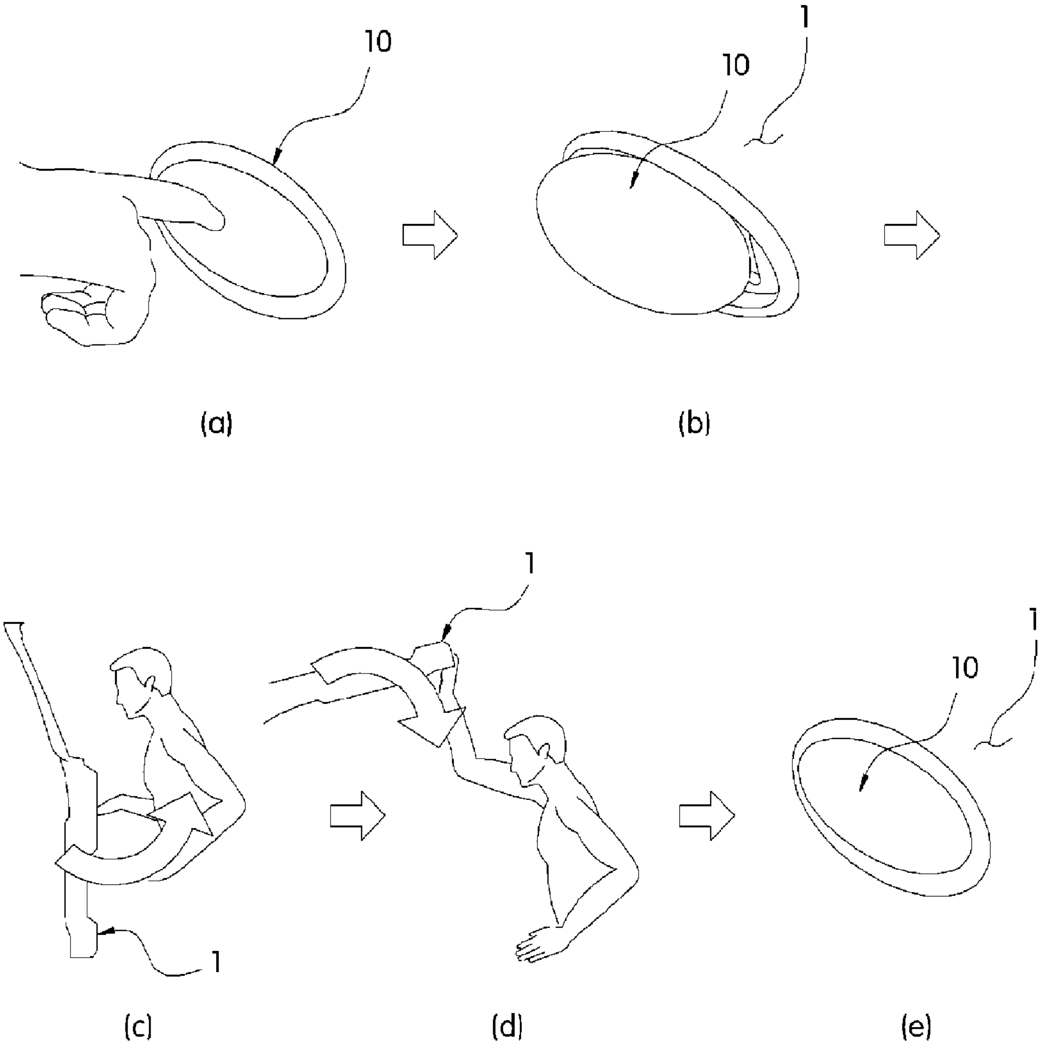
FIG. 8 is a schematic view illustrating a method for manipulating the tailgate outside handle according to an exemplary embodiment of the present invention.

FIG. 8 is a schematic view illustrating a method for manipulating the tailgate outside handle according to an exemplary embodiment of the present invention.

As illustrated in FIG. 8, a user pushes the logo portion (manipulation portion) 11 of the manipulating handle 10 to open a tailgate.

Next, a bottom end portion of the manipulating handle 10 is rotated about the hinge shaft 14 when the manipulating handle 10 is withdrawn by a minute distance, e.g., approximately 10 mm by the driving force of the drive motor 30 as the logo portion 11 is pushed.

Then, the handle grip 12*a* formed on the inner side of a bottom end portion of the manipulating handle 10 is exposed to the outside and a user inserts a hand and grips the handle grip with the hand to lift the handle grip and open the tailgate.

Thereafter, if a user pushes the tailgate downward to close it, the manipulating handle 10 is automatically returned to the original position by a driving force of the drive motor 30.

Hereinafter, an opening operation state of the manipulating handle 10 will be described with reference to the accompanying drawings.

FIGS. 9 to 13 are sectional views illustrating operation states of the outside handle assembly when the tailgate is opened.

Figure 9:
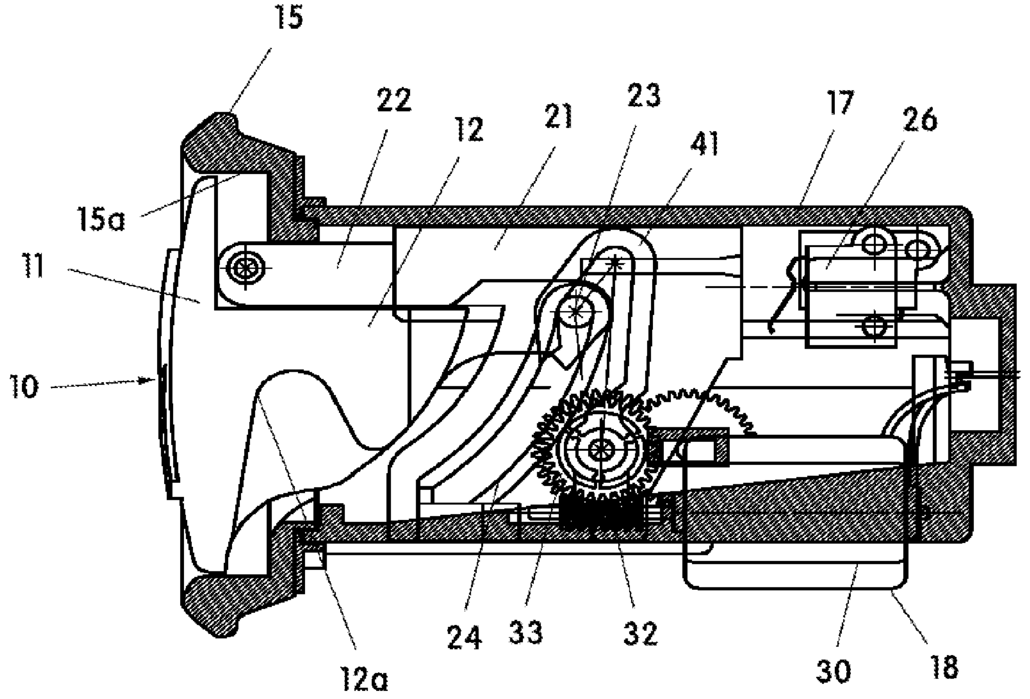
FIGS. 9 to 13 are sectional views illustrating operation states of the outside handle assembly when the tailgate is opened.
Figure 10:
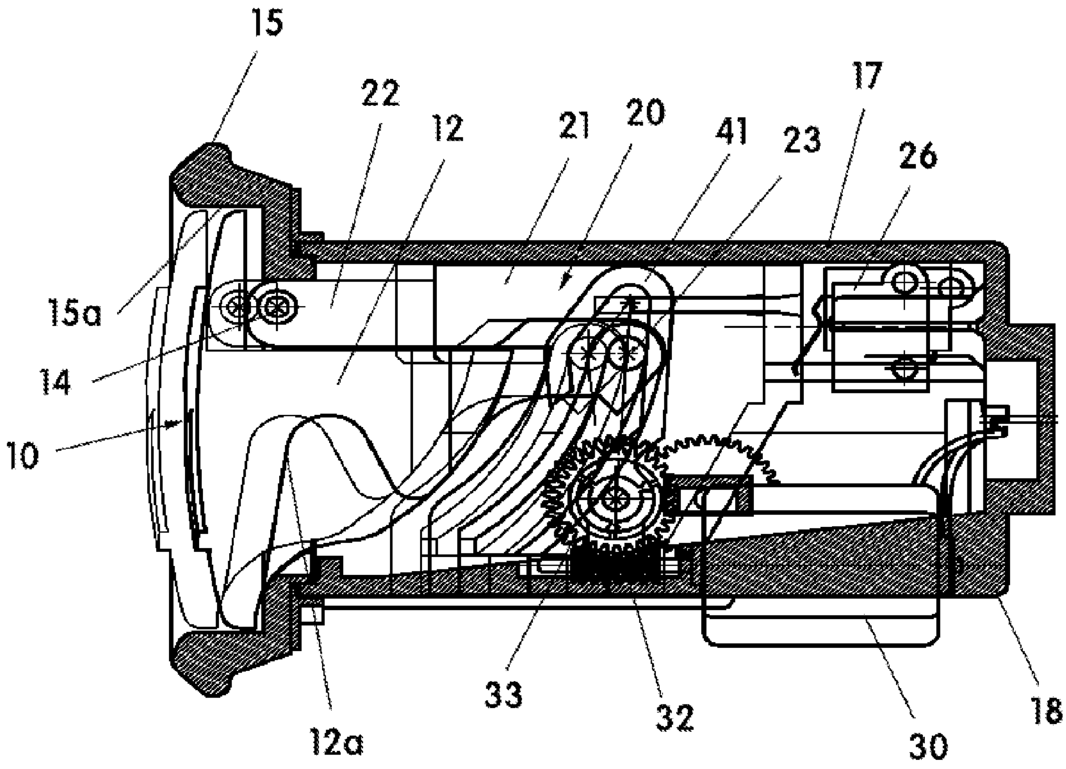

If a user pushes the logo portion 11 of the manipulating handle 10 lightly with a hand as illustrated in FIG. 9, the logo portion 11 is moved and inserted into the insert recess of the logo base 15 as illustrated in FIG. 10 and a rear end portion of the movable housing 20 pushes a contact pin of the first micro-switch 26 while the movable housing 20 hingedly coupled to a rear surface of the logo portion 11 by means of the hinge shaft 14 is being pushed to the inside of the chassis.

Thereafter, the contact pin of the first micro-switch 26 contacts with the contact terminal to be switched on, and the drive motor 30 is driven by applying power to the drive motor 30.

Next, if the drive motor 30 is operated, an RPM of the drive motor 30 is reduced by the gear train 44.

In the operational state of the gear train 44, as the worm 32 integrally formed in an output shaft of the drive motor 30 is rotated, the worm gear 33 enmeshed with the worm 32 at a certain gear ratio is rotated to reduce the RPM first.

Then, as the drive gear 34 connected to the worm gear 33 through the drive shaft 38 is rotated at the same RPM as the worm gear 33, the first driven gear 35 enmeshed with the drive gear 34 at a certain ratio is rotated to reduce the RPM second.

At the same time, as the second driven gear 36 connected to the first driven gear 35 is rotated at the same RPM as the first driven gear 35, the third driven gear 37 enmeshed with the second driven gear 36 at a certain gear ratio is rotated to reduce the RPM third.

Thereafter, the third driven gear 37 transfers a rotational force to the rotary lever 41 at the same RPM and at the same rotational angle.

Figure 11:
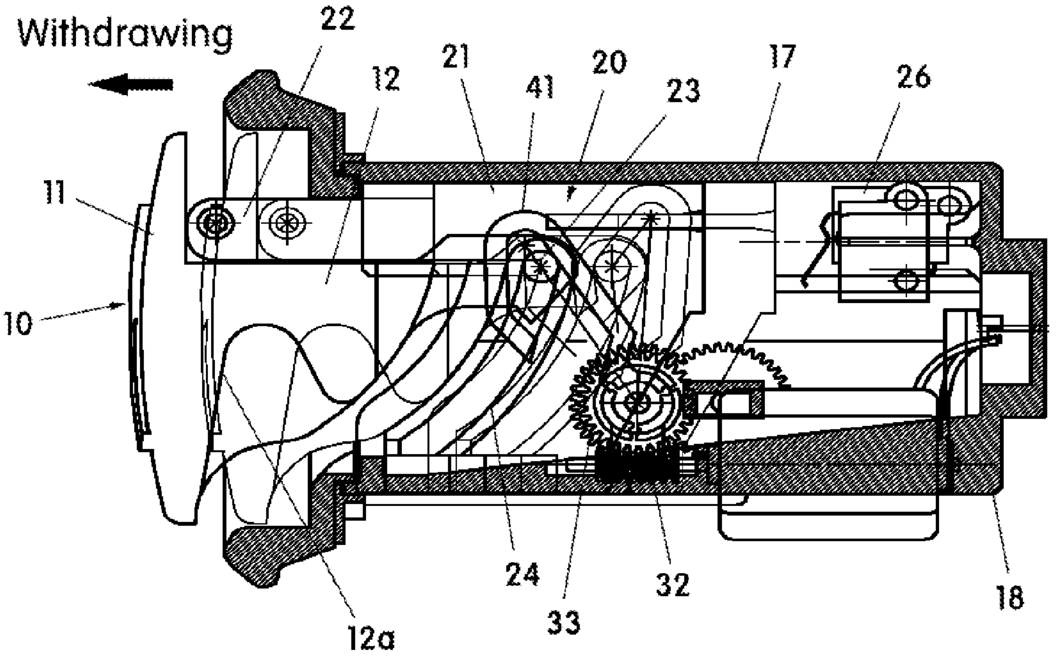

As illustrated in FIG. 11, the rotary lever 41 whose RPM is reduced through the gear train 44 is rotated counterclockwise about its central shaft to push the rotary shaft 23 inserted into the rotation guide holes 24 of the movable housing 20 to the outside of the chassis, moving the movable housing 20 to the outside of the chassis and withdrawing the manipulating handle 10 hingedly coupled to the push boss 22 of the movable housing 20.

Then, the movable housing 20 is moved by a certain distance by rotation of the rotary lever 41 and then is stopped.

Figure 12:
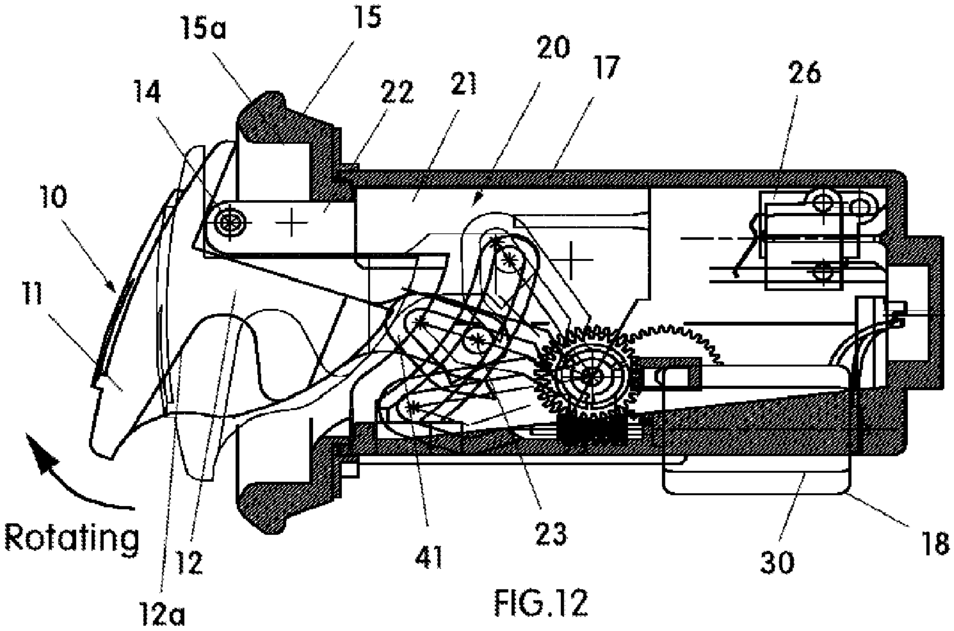
Figure 13:
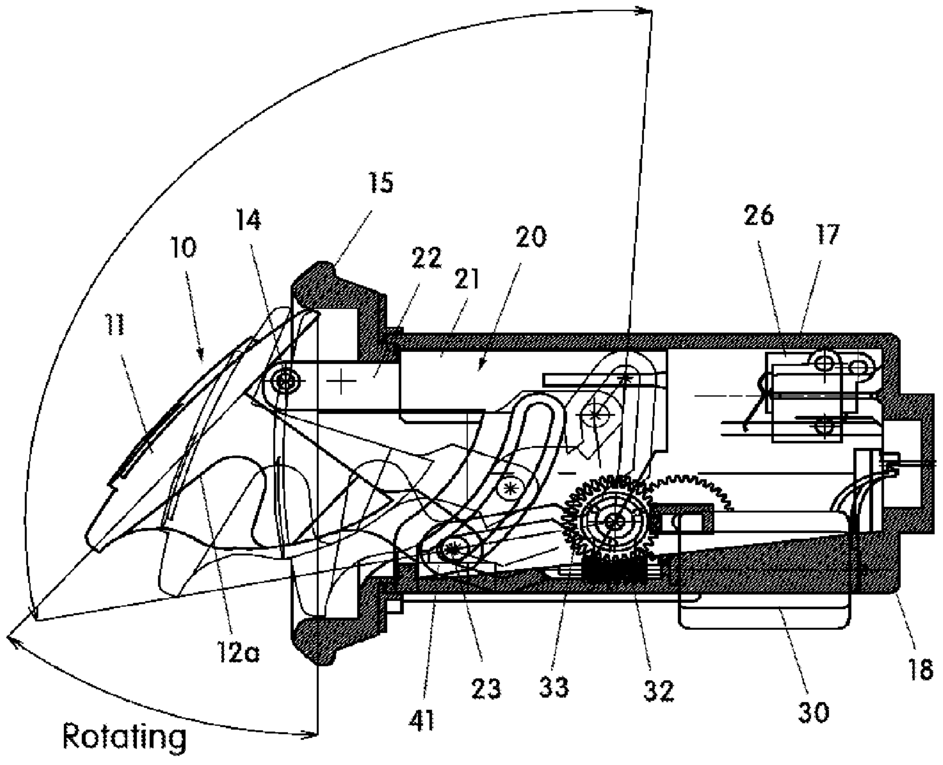

Next, as illustrated in FIGS. 12 and 13, the rotary shaft 23 is rotated downward along the rotation guide holes 24 of the movable housing 20 with the movable housing 20 being stopped, and the handle housing 12 is rotated while the rotation guide bosses 13 shaft-coupled to the rotary shaft 23 are being rotated.

Here, the handle grip formed at a lower portion of the manipulating handle 10 is exposed when a bottom end portion of the manipulating handle 10 is rotated upward, such that a user can grip the handle grip with a hand.

Hereinafter, the closing operation state of the manipulating handle 10 will be described with reference to the accompanying drawings.

Figure 14:
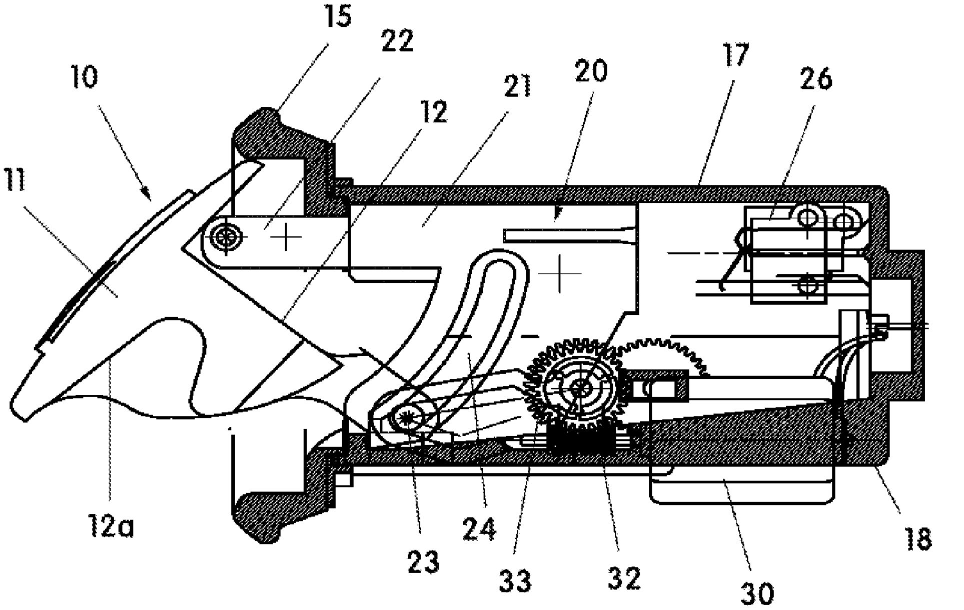
FIGS. 14 to 16 are sectional views illustrating operation states of the outside handle assembly when the tailgate is closed.
Figure 15:
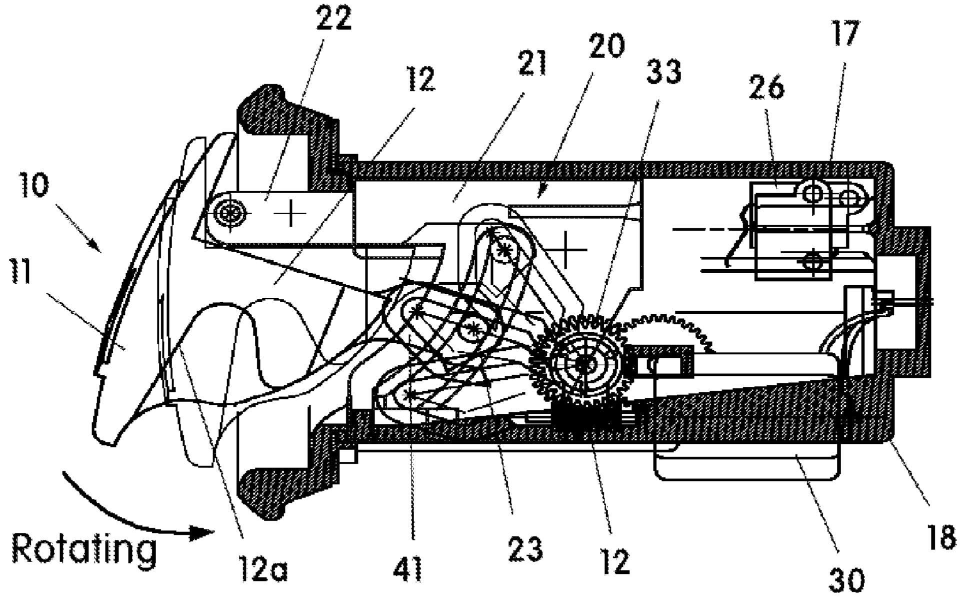
Figure 16:
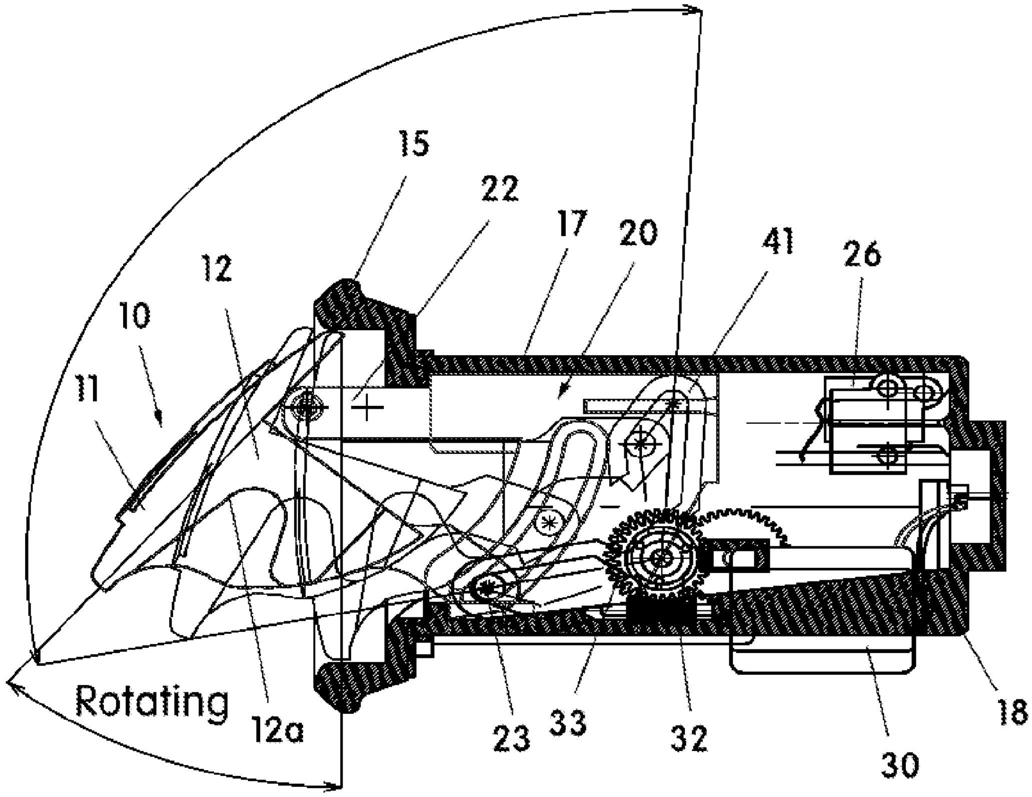

FIGS. 14 to 16 are sectional views illustrating operation states of the outside handle assembly when the tailgate is closed.

As illustrated in FIGS. 15 and 16, the rotary lever 41 receives a rotational force through the gear train 44 and is rotated clockwise to lift the rotary shaft 23, and the rotary shaft 23 is rotated upward along the rotation guide holes 24 of the movable housing 20 with the movable housing 20 being stopped and the rotation guide bosses 13 shaft-coupled to the rotary shaft 23 are rotated upward to rotate the handle housing 12 to the original position.

Then, if the manipulating handle is rotated to the original position and the rotary lever 41 is rotated further counterclockwise, the movable housing 20 is inserted into the chassis such that the manipulating handle 10 coupled to the push boss 22 of the movable housing 20 is inserted into the insert recess of the logo base 15 to return to the original position.

Hereinafter, the operation and effect of the tail gate outside handle assembly according to an exemplary embodiment of the present invention will be described in detail.

The main feature of the present invention is a mechanism in which if the manipulating handle 10 is pushed toward the inside of the chassis, it functions as a switch to apply power to a motor and the rotary lever 41 is rotated by the operation of the motor to automatically withdraw and rotate the manipulating handle 10 continuously.

The manipulating handle 10 is a logo integrated outside handle having a logo portion 11 on the entire front side thereof wherein the hinge shaft 14 is coupled to a top end portion of a rear surface of the logo portion 11 such that a bottom end portion of the manipulating handle 10 is rotated about the hinge shaft 14 after the manipulating handle 41 is withdrawn to the outside of the chassis by a minute distance.

As the manipulating handle 10 is withdrawn toward the outside of the chassis by a minute distance, interference between a top end portion of the manipulating handle 10 and the logo base 15 can be avoided and a bottom end portion of the manipulating handle 10 can be rotated by a rotational force of the drive motor 30.

According to the mechanism of the manipulating handle 10, the handle grip is normally hidden within the manipulating handle 10, and if a bottom end portion of the manipulating handle 10 is automatically opened toward the outside of the chassis by a pushing operation of the manipulating handle 10, the handle grip formed inside of a lower portion of the manipulating handle 10 is exposed to the outside and is lifted with it being gripped with a hand of a user to open the tailgate.

Thus, an appearance of the logo integrated outside handle can be improved normally.

In particular, a mechanism for withdrawing and rotating the manipulating handle 10 can be utilized more effectively when the logo portion 11 of the manipulating handle 10 is elliptical.

For example, when the logo portion 11 is elliptical, interference between the elliptical logo portion 11 and the logo base 15 can be avoided by withdrawing the manipulating handle 10 by a minute distance and an opening angle of the handle grip can become larger by rotating a bottom end portion of the manipulating handle 10.

Further, an in-use range of the mechanism for withdrawing and rotating the manipulating handle 10 can be widened further.

For example, if a rear camera is mounted into the handle grip and the vehicle is shifted to a rear gear (R), the BCM detects it and operates a motor for the manipulating handle 10 separately from a pushing operation of the manipulating handle 10 during a opening operation of the tailgate to open the manipulating handle to the outside of the chassis and secure a rear visual field by operating the rear camera.

Furthermore, an illumination unit is mounted into the handle grip together with the rear camera to secure a rear visual field at night.

Moreover, a vehicle distance sensor is mounted into the handle grip to secure safety of the vehicle.

Although it has been exemplified that the manipulation handle 10 is withdrawn and rotated by a driving operation of the drive motor 30, it may be withdrawn and rotated by other mechanisms such as a coil spring, a plate spring, a hydraulic/pneumatic cylinder as well as by the drive motor.

Further, although it has been exemplified that the manipulation handle 10 is operated by pushing the logo portion 11 serving as a manipulation portion, a separate manipulating unit such as a non-contact sensor or a remote key of the logo portion may be employed such that the manipulation of the logo portion can be detected in a non-contact manner by the non-contact sensor or electric power may be applied to the drive motor 30 when the remote key is manipulated, allowing the manipulating handle to be operated in the same manner as the pushing operation of the logo portion.

For convenience in explanation and accurate definition in the appended claims, the terms “upper”, “lower”, “inner”, “outer”, “forwards” and “backwards” are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A tailgate outside handle assembly comprising:

a housing installed in an outer panel of a tailgate;

a movable housing being slidably mounted to an interior of the housing to slide in the housing;

an actuator unit;

a manipulating handle having a manipulation portion in a front surface thereof and selectively opening or closing the housing;

a hinge shaft pivotally coupling a top end portion of a rear surface of the manipulation portion to the movable housing;

wherein an end portion of the manipulation portion is pivotally engaged with the actuator unit and selectively rotated about the hinge shaft such that after the manipulation portion is withdrawn to the outside of the housing by a driving force of the actuator unit when the tailgate is to be opened, the manipulating handle works as a handle.

2. The tailgate outside handle assembly of claim 1, wherein the movable housing is selectively engaged with a switch such that power is applied to the actuator unit when the manipulating handle is pushed.

3. The tailgate outside handle assembly of claim 1, wherein the manipulating handle has a handle housing formed at the rear surface of the manipulating portion; and wherein a handle grip is formed at a lower portion of the handle housing.

4. The tailgate outside handle assembly of claim 3, wherein the manipulating handle further includes:

wherein a rotation guide hole is formed on a lateral surface of the movable housing; and wherein an end of a rotary lever is engaged with the actuator unit and the other end thereof is slidably engaged with the rotation guide hole of the movable housing and a rear end portion of the handle housing through a rotary shaft, such that the actuator unit rotates a bottom end portion of the manipulation portion while the rotary lever pushes the movable housing and the handle housing outwards the housing with a rotational force of the actuator unit.

5. The tailgate outside handle assembly of claim 4, wherein a latchet having a locking recess therein is mounted to an upper surface of the movable housing and a locking pin integrally protrudes from an upper inner end of the housing such that the locking pin is mounted into the locking recess to adjust a pushing amount of the manipulating handle.

6. The tailgate outside handle assembly of claim 5, wherein a rotation guide boss is formed at the rear surface of the manipulation portion, and the rotation guide boss of the manipulation portion and the movable housing are pivotally coupled by the hinge shaft, such that the handle grip is exposed to the outside of the housing by the actuator unit when the manipulating handle is pushed.

7. The tailgate outside handle assembly of claim 4, wherein the bottom end portion of the manipulation portion is biased toward the interior of the housing.

8. The tailgate outside handle assembly of claim 4, wherein the switch is placed at a rear side of the movable housing in the housing such that when the manipulating handle is pressed toward the interior of the housing, the movable housing coupled to the manipulating handle is pushed toward the interior of the housing to turn on the switch and apply power to the actuator unit.

9. The tailgate outside handle assembly of claim 1, wherein the actuator unit is a motor, and a gear train having a worm formed in an output shaft of the motor and a worm gear enmeshed with the worm.

* * * * *